April 4, 1950 W. W. KINNEY 2,502,793
FISHHOOK REMOVER
Filed June 11, 1947
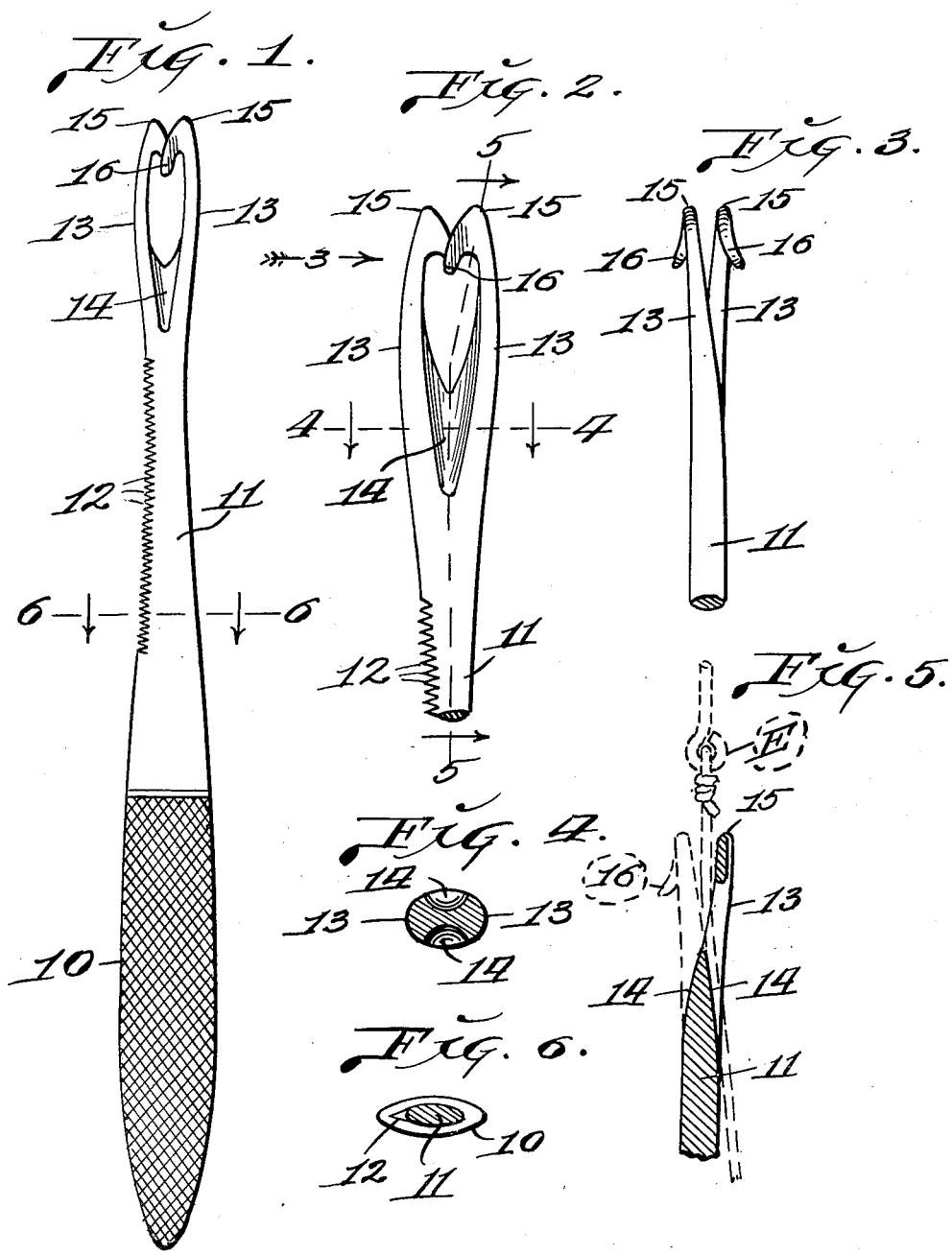
INVENTOR.
WALTER W. KINNEY.
BY
Martin P. Smith
ATTY.

Patented Apr. 4, 1950

2,502,793

UNITED STATES PATENT OFFICE 2,502,793

FISHHOOK REMOVER

Walter W. Kinney, Redondo Beach, Calif.

Application June 11, 1947, Serial No. 753,881

2 Claims. (Cl. 43—53.5)

My invention relates to a fish hook remover and has for its principal object, to provide a simple, practical and inexpensive one piece implement which may be conveniently employed for easily and quickly removing fish hooks which have been swallowed and lodged in the gullets of fish and which implement is constructed so as to accomplish the hook removal function without the necessity for grasping the hooked fish with the hands and without in any way cutting or tearing the fish so as to affect its appearance.

Further objects of my invention are, to provide a fish hook remover of the character referred to, which may be used to equal advantage by both right and left handed persons, and further, to provide the implement with a serrated edge which may be advantageously used in removing scales from fish.

With the foregoing and other objects in view, my invention consists in certain novel features of construction and arrangement of parts which will be hereinafter more fully described and claimed and illustrated in the accompanying drawing, in which:

Fig. 1 is side elevational view of my improved fish hook remover.

Fig. 2 is an enlarged fragmentary elevational view of the forward end of the implement.

Fig. 3 is a fragmentary edge view looking in the direction indicated by the arrow 3 in Fig. 2.

Fig. 4 is a cross section taken on the line 4—4 of Fig. 2.

Fig. 5 is a fragmentary longitudinal section taken on the line 5—5 of Fig. 2.

Fig. 6 is a cross section taken on the line 6—6 of Fig. 1.

Referring by numerals to the accompanying drawing, which illustrates a preferred embodiment of my invention, 10 designates a handle, preferably corrugated or milled to facilitate hand grip, and projecting from one end of said handle is a short arm 11, serrated along one edge as designated by 12 so as to enable the implement to be used in fish scaling operations.

The forward end of arm 11 is bifurcated to form a pair of identically spaced fingers 13, bowed away from each other to a slight degree and formed in the side faces of said fingers, adjacent the point where same join arm 11, are longitudinally disposed grooves 14 which receive and guide the fish line when the implement is applied thereto and moved toward and into engagement with the embedded hook.

The ends of fingers 13 which are spaced a slight distance apart, terminate in inverted U-shaped hooks 15, the free ends 16 of which are disposed on opposite sides of the major axis of handle 10 and arm 11, and said free ends curve gradually outward toward their terminal portions.

The space between the hooks 15 is slightly less than the external diameter of the eyes E of average and larger sized fish hooks, and thus, when the forward end of the implement is moved toward and into contact with the hook, the eye, in order to pass between the hooks, must make an approximate quarter turn, thus imparting corresponding turning movement to the hook. This quarter turning movement of the hook, takes place automatically as a result of the passage of eye E between hooks 15, and before subsequent manual turning of the implement, when said hooks engage the barbed end of the hook and the flesh of the fish, in which said barbed end is embedded.

In using my improved fish hook remover, the same, held in either hand, is manipulated so that the fishing line is positioned between fingers 13, in one or the other of grooves 14 and the device is now run down the line toward and into the mouth of the fish and as hook eye E passes between hooks 15, said eye and the fish hook will be rotated a quarter turn so as to enable said hooks 15 to be moved to the embedded barbed end of the fish hook and with slight pressure of the hooks 15 against the fish, the implement is now manually rotated in either or both directions, thus dislodging the embedded hook and permitting the fish to drop therefrom.

During rotation of the implement, the outwardly curved ends 16 of hooks 15 press the flesh of the fish of the hooked fish away from the embedded portion of the fish hook, thus greatly facilitating the hook removal function.

Thus it will be seen that I have provided a fish hook removing implement that is simple in structure, inexpensive of manufacture and very effective in performing the functions for which it is intended.

Minor changes in the size, form and construction of the various parts of my improved fish hook remover may be made and substituted for those herein shown and described without departing from the spirit of the invention, the scope of which is set forth in the appended claims.

I claim as my invention:

1. In a fish hook remover, a handle, a pair of identical fingers on one end of said handle, and spaced hooks on the free ends of said fingers the free ends of said hooks being rounded and being curved outwardly away from each other and from said fingers, there being short longitudinally disposed grooves in the side faces of said handle at the junction of the fingers and the handle.

2. The fish hook remover as set forth in claim 1, with said fingers curving gradually away from each other and from the axis of the handle.

WALTER W. KINNEY.

REFERENCES CITED

The following references are of record in the file of this patent:

UNITED STATES PATENTS

| Number | Name | Date |
|---|---|---|
| 400,112 | Post | Mar. 26, 1889 |
| 1,788,656 | Brown | Jan. 13, 1931 |

FOREIGN PATENTS

| Number | Country | Date |
|---|---|---|
| 3,292 | Great Britain | of 1886 |
| 760,116 | France | Feb. 16, 1934 |